July 15, 1958   J. A. ACOSTA   2,843,270
SEPARATING CONDITIONER
Filed May 11, 1956   3 Sheets-Sheet 1

INVENTOR.
JORGE A. ACOSTA,
BY
McMorrow, Berman + Davidson
ATTORNEYS.

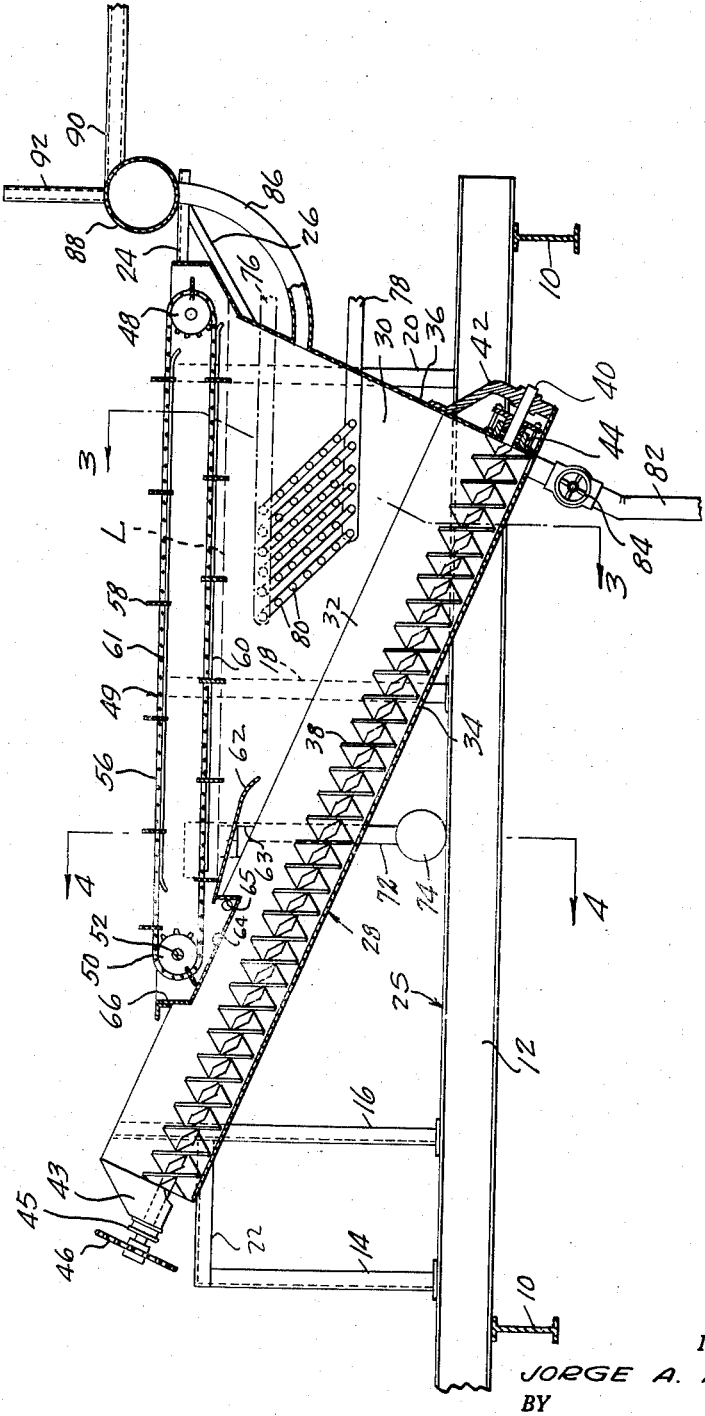

July 15, 1958 J. A. ACOSTA 2,843,270
SEPARATING CONDITIONER
Filed May 11, 1956 3 Sheets-Sheet 3
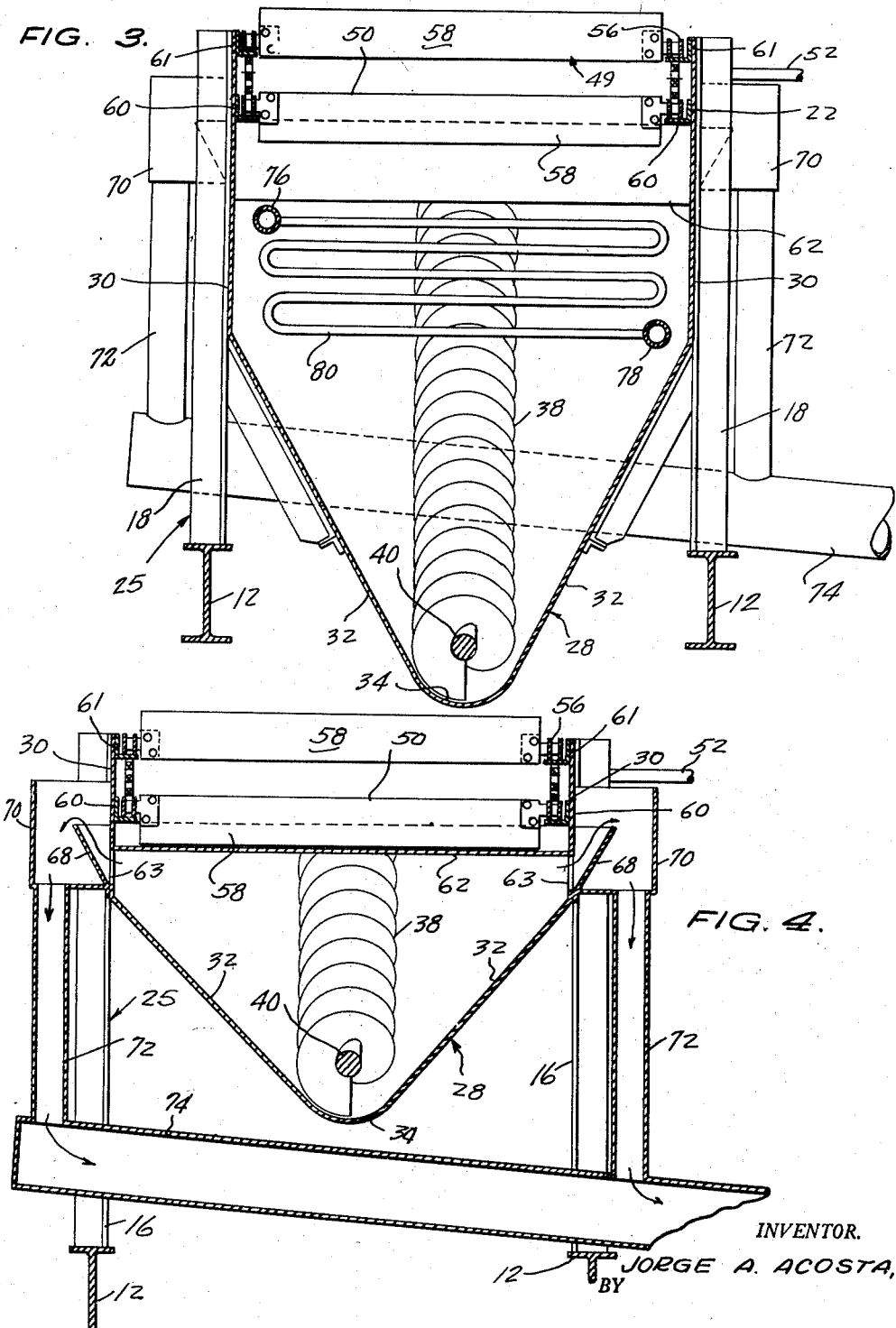

2,843,270

SEPARATING CONDITIONER

Jorge A. Acosta, Vero Beach, Fla.

Application May 11, 1956, Serial No. 584,218

3 Claims. (Cl. 210—525)

This invention relates to a method of and means for removing, by mechanically acting means, all solids from a liquid that will either precipitate or float in said liquid.

The method and apparatus constituting the present invention have general utility in any instance in which it is desired to remove from a liquid slurry solids having the above mentioned characteristics, as for example sedimentary waste and floating scums.

One object of importance is to provide an apparatus and method as described so designed as to make it possible to remove by mechanical action, continuously and automatically, all solid matters which will settle on the bottom of a tank, as well as all those which will float upon the top of any liquid slurry pumped into the tank, in the form of a scum.

Summarized briefly, the invention includes means for thoroughly mixing a liquid slurry, prior to slow gravitational feeding of said slurry into a tank in which the separation process is carried out. At the bottom of the tank is an inclined conveyor means of the screw type, so arranged relative to the tank as to continuously convey from the tank solids precipitated on the bottom of the tank. Traveling upon the top portion of the tank is a cleated conveyor, the cleats of which extend downwardly into the liquid slurry a short distance, said conveyor traveling at a slow rate of speed so as to continuously convey to an outlet, scums forming upon the top of the liquid. Means is provided within the tank for heating the liquid slurry to a predetermined temperature, to encourage the precipitation of some of the solids contained within the liquid and to encourage, further, the floating of the remaining solids for removal by the screw and cleated conveyors, respectively.

One important object is to provide an apparatus and method which will be fully automatic in its operation, so as to be usable without the necessity of workers giving constant attention ot the apparatus.

A second object is to provide apparatus as stated which will be of a high degree of efficiency as regards the removal of settlings and floatable solids, with the apparatus being so designed as to act efficiently on liquids containing both types of solids, as well as on liquids containing one or the other of the types alone.

A further object is to so design the apparatus as to permit a highly efficient slow mixing of the liquids prior to entrance thereof into the tank, with the intermixing means being so designed as to produce a natural suction within an expansion tank in which the mixing action takes place, which suction can be used to advantage to introduce and thoroughly intermix with the liquid any desired chemicals or gases for the purpose of sterilizing, defecating, bleaching, or other purposes; and for the further purpose of introducing boiler flue gases which can be added to certain liquids in a manner to react as a precipitant with chemical compounds present in the liquid. Conversions or chemical reactions of the type referred to are of great importance in various industries, as for example in the sugar industry.

A further object is to provide a device of the character referred to which will be capable of being easily cleaned when not in use, will require only a single driving unit, and will employ to a great extent gravitational action to produce the separation without loss of efficiency.

Other objects will appear from the following description, the claims appended thereto, and from the annexed drawing, in which like reference characters designate like parts throughout the several views, and wherein:

Figure 2 is a longitudinal section on line 2—2 of Figure 1, on a reduced scale;

Figure 3 is a transverse section on line 3—3 of Figure 2, on the same scale as Figure 1; and Figure 4 is a transverse section on line 4—4 of Figure 2, on the same scale as Figure 1.

Figure 1:
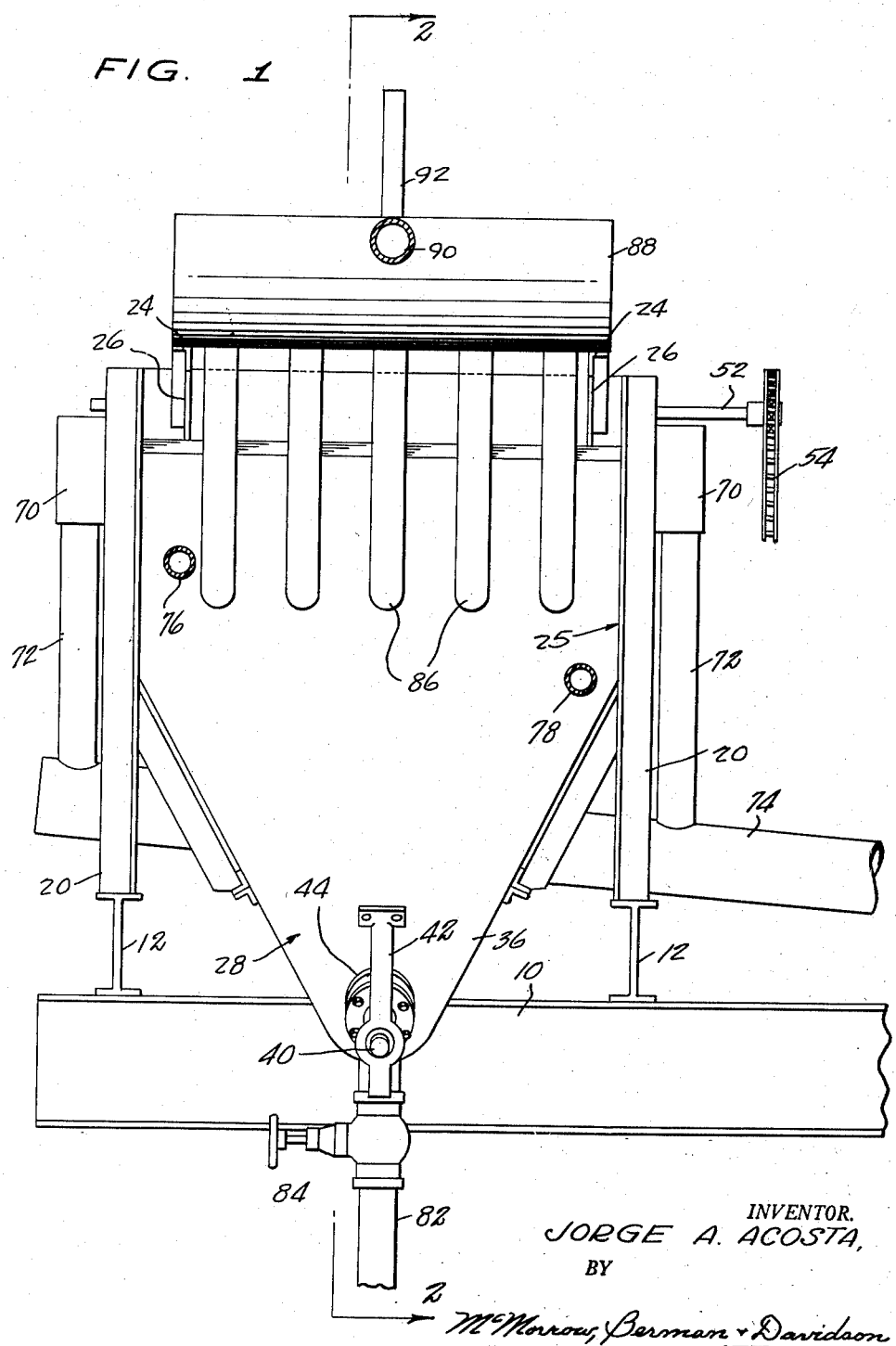
Figure 1 is a front elevational view of apparatus formed according to the present invention.

Referring to the drawings in detail, designated at 10 are supporting cross beams, and extending perpendicularly to and supported upon the cross beams 10 are longitudinal support beams 12 extending along opposite sides of the apparatus as shown in Figure 1.

The beams 12 are fixedly secured in any suitable manner to the beams 10, and fixedly mounted upon and projecting upwardly from the longitudinal beams 12 are posts 14, 16, 18, 20. These are spaced longitudinally of the beams 12 as shown in Figure 2, at opposite sides of the apparatus. Fixedly secured to the posts 20 are horizontal support bars 24.

The several elements so far described may appropriately be considered as constituting a support frame generally designated by the reference numeral 25.

Bracing the bars 24 at the front ends thereof, for the purpose of affording proper support for an expansion tank to be described hereinafter, are inclined brace members 26.

Extending longitudinally of the frame is a separation tank generally designated 28. This includes side walls 30, merging at their lower edges into an elongated trough substantially of inverted V-shape in cross section, having downwardly converging side walls 32 connected at their convergent ends integrally by a transversely depressed bottom wall 34 of the trough.

The trough is inclined as shown in Figure 2, one end of the trough being disposed just below the general plane of the longitudinal support means 12, with the other or discharge end of the trough being disposed above the working level L of the liquid deposited in the tank 28 (see Figure 2) for a purpose to be made presently apparent.

The front wall of the tank has been designated 36, and is also included, said front wall lying in a plane normal to the length of the trough as shown in Figure 2.

Extending within the bottom of the trough is a multi-flight helical or screw conveyor 38, including a shaft projecting through an opening formed in the front wall 36, the shaft being designated 40 and being journalled in a bearing 42 carried by the tank. To prevent leakage through the opening of the front wall, there is provided a packing gland 44 surrounding the shaft at the location of said opening.

At its other end, the shaft 40 is journalled in an upper bearing 43 and adjacent said bearing is a thrust collar 45. The shaft is connected to a sprocket 46, about which would be trained a chain extending from a drive means, not shown. The driving linkage to the shaft would include a speed reduction means, designed to lower the speed or rotation of the shaft to approximately two and one-half revolutions per minute.

The invention further includes a slatted conveyor generally designated at 49, said conveyor including spaced sprockets 48, 50 journalled in the frame transversely of and above the expansion tank 28. Sprocket 50 constitutes a drive sprocket, from which extends, at one side, the shaft 52 (see Figure 1). Secured to the shaft 52 is a sprocket about which is trained a drive chain 54. Chain 54 can be driven from the same driving source or prime mover as is used to drive, at a slow speed, multiflight conveyor 38. The speed of rotation of the shaft 52 is reduced by a suitable means to approximately three and one-half revolutions per minute, in a preferred embodiment.

Passing about the rollers 48, 50 and driven thereby are conveyor chains 56. At uniformly spaced intervals upon the chains, there are provided cleats or slats 58 projecting normally to the planes of the upper and lower flights of the chains as shown in Figure 2, and extending across the full width of the conveyor as best shown in Figure 3.

The upper and lower flights of the chains are supported upon horizontally disposed guide rails of angle iron material as shown in Figures 2 and 3, the lower flight being supported upon guide rails 60 secured to the inner surfaces of the side walls 30, with the upper flight of the conveyor being carried by guide rails 61. The construction can be strengthened as desired, by connecting the guide rails to the several upstanding posts, through the side walls 30.

During operation of the conveyor, the slats 58 extend downwardly from the lower flight of the chains and enter the liquid that is deposited in the tank 28, penetrating the liquid a short distance, so as to skim from the working level L scum or other floating materials rising to said level. The conveyor moves clockwise in Figure 2, and accordingly, said scum is conveyed by the slats 58 to an apron 62, disposed just above side outlets 63 (Figures 2 and 4) provided in the side walls of the tank. The liquid within the tank, separated from the precipitating and floating solids, flows through the side outlets, in a manner to be discussed in greater detail hereinafter.

Meanwhile, the scums and various floating solids are forced upwardly upon the apron 62, with the cleat 58 riding upon the apron as shown in Figure 2, so as to drop into a discharge tray 64 for floating solids, the bottom of which tray is inclined into parallelism with the bottom 34 of the trough. Said tray extends the full width of the conveyor 49, and at opposite sides of the tray 64 there are provided outlets 65 through which the floating solids flow by gravitation. The tray has a back wall 66 beyond the discharge end of the slatted conveyor 49.

Alternatively, it may be desired to discharge the floating waste directly above the liquid level L, on top of the precipitated solids that are being carried out of the tank by the screw conveyor, mixing the precipitants and the scums together for dumping. In this event, the tray would be removed. With the tray provided, however, the removed scums are washed away separately from the settlings conveyed from the tank by the screw conveyor.

The clean liquor or liquid, flowing through the outlets 63, overflows within oppositely inclined weirs 68 (Figure 4), and flows into side troughs 70, flowing downwardly from the side troughs through conduits 72 vertically arranged at opposite sides of the apparatus and communicating at their lower ends with a transversely extending, slightly inclined main liquor discharge conduit 74, the inclination of which permits removal of the clean liquor by gravitation.

Means is provided for heating the liquid slurry within the tank 28, it being preferred that the temperature of the slurry to be raised to about 125 degrees F., while the liquid is flowing throughout the length of the tank. To this end, inlet and outlet steam pipes 76, 78 extend through the front wall of the tank, from a steam-producing source, and are connected within the tank by a closed steam coil 80 disposed approximately medially between the top and bottom of the tank at the forward end thereof.

Drain means is also provided for the apparatus, to permit the same to be washed out or fully drained whenever desired. To this end, a drain pipe 82 extends downwardly from the lower, front end of the trough, and is provided with a manually operable valve 84.

Referring now to Figures 1 and 2, means is provided in the apparatus for introducing the liquid slurry that is to be acted upon within the tank. To this end, a plurality of curved inlet tubes 86 extend into the tanks through the front wall, said tubes being spaced uniformly apart, transversely of the apparatus, to provide a manifold type inlet for the separation tank 28. At the ends of the tubes that communicate with the tank, said tubes are approximately horizontally disposed, the purpose being to effect a slow gravitational flow of the slurry into the separating tank. This will reduce to a minimum the disturbance and agitation that takes place as the slurry enters the separator, with the slurry moving into the tank approximately midway between the working level L and the bottom of the tank.

The tubes 86 extend downwardly from an expansion tank 88 of cylindrical formation. This is horizontally disposed, transversely of the apparatus, being supported upon the rails 24. Liquid supplied to the expansion tank 88 flows thereto through a supply pipe or conduit 90 entering the tank in tangential relation thereto under substantial pressure as shown in Figure 2. By reason of this arrangement, there is produced a whirling or centrifugal motion which thoroughly and effectively intermixes the precipitant and floating solids with the liquid, prior to movement of the slurry to the separation tank. A vent 92 projects upwardly from the tank.

The entire output of the tank drains into the separating tank 28 through the manifold type separation tank inlet 86. In this connection, a natural suction is produced inside the expansion tank 88 by the centrifugal whirling motion and by the gravity flow of the liquid. This suction can be advantageously employed to introduce and thoroughly intermix inside the expansion tank any desired chemical or gases with the liquid substance being processed. Should such introduction of chemicals or gases be desired, the vent 92 can be employed for the purpose of providing an inlet for these materials. Chemicals or gases are introduced, many times, for the purpose of sterilizing, bleaching, or other liquid treatments.

Further, the vent can be used advantageously in combination with the natural suction produced within the expansion tank, to introduce boiler flue gases. If these are added in sufficient quantities to, for instance, cane juice treated with lime (this being the general practice to obtain decantation and clarification) the mixture will react as a precipitant with both the carbon dioxide and the sulphur dioxide which are always present in flue gases. For example, lime water plus carbon dioxide produces calcium carbonate, which is a precipitant. Then again, lime water plus sulphur dioxide produces calcium sulphite which is also a precipitant.

These conversions or chemical reactions are of great importance in the sugar industry, since they provide an opportunity to separate these substances from the juice partly in the separating tank, completing the settling in the process that follows in the clarifier. In this way there is minimized the amount of scale formation inside the evaporator tubes of the clarifier while processing the juice, also obtaining a finished product with less ash content.

It may be noted that the liquor outlets 63 are disposed at the end of the separation tank opposite the end having the liquid slurry inlet. The purpose of this is to provide the maximum distance possible, over which the slurry is made to travel within the separation tank, to allow maximum time for solid particles to settle or rise during the flow of the slurry through the length of the tank.

In operation, with the liquid being first thoroughly intermixed in the expansion tank 88 and then caused to flow slowly by gravity action into the separation tank below the working level L, the liquid will be heated within the separation tank, and will pass slowly to the outlets 63. As previously noted, some of the solids will precipitate within the trough while others will float. The precipitant will be carried upwardly by the conveyor 38, and as noted in Figure 2, said conveyor at its discharge end extends above the working level L. The purpose of this is to provide, as much as possible, for draining back of the maximum amount of liquid from the settlings after said settlings have broken through the surface or liquid level before being dumped from the discharge or left hand end of the trough 28.

Meanwhile, the slats of the conveyor 49 are skimming from the surface of the liquid the floating solids, with these being dumped into the discharge tray 64.

Many uses can be found for the method and means constituting the present invention. Thus the versatility of the apparatus and the adaptability for use in various industries is enhanced, in this regard, by reason of the fact that the machine requires no operator, and acts entirely automatically to effect the desired separation mentioned. Further, a single driving unit is all that is needed for operation thereof, and the design is such as to permit fabrication of the apparatus at relatively low cost. Its use does not require the addition of expensive materials, and it may therefore be installed as an auxiliary unit to remove the thicker sedimentations and scums as an aid to clarifiers, etc.

The machine, as previously noted, has particular advantage for use in the sugar industry. The machine may be used as a type of strainer for the recovery of sugars in the processing of sugar cane muds. This is done by first diluting the mud with hot water to the required proportions, and then circulating the slurry through the separating conditioner, dumping the damp solids removed and returning the cloudy wash water, saturated with most of the sugars, to the raw juice tanks. The solids removed and dumped will not test above 2% sucrose if the mud is diluted in three parts of hot water to one part of mud, but will test much lower depending upon the amount of water used.

Further, with a change in operating procedure and conveyor speeds, the same apparatus could be used to advantage in processing solids which either have to be automatically soaked and drained in a continued smooth-running operation, or which have to be either washed with water or treated with some kind of liquid chemicals, as, for example, in the processing of pulp wood in the paper making industry, etc.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In apparatus for separating a liquid slurry into a plurality of components among which are floating solids, a tank confining said slurry; an endless conveyor chain mounted in the top of said tank and having a lower flight extending horizontally within the tank; slats carried by and projecting outwardly from said chain so as to extend into the slurry and skim floating solids therefrom responsive to operating of the conveyor chain; an inclined apron in the path of the slats, said slats wiping over the face of the apron for shifting the solids out of the slurry and up the inclined surface of the apron; and trough means disposed beyond the apron in the sense of the direction of movement of the slats of the lower flight for receiving the solids, the tank having an outlet communicating with the trough means for flow of said solids out of the trough means, said trough means and apron forming beneath the apron a trap for the slurry, the tank having a discharge opening communicating with the trap for passage of the slurry out of the tank, said tank including opposed side walls, the apron and trough means extending transversely of the tank over the full distance between said side walls, said trough means comprising an abutment the bottom edge of which is spaced downwardly a short distance from the bottom edges of the slats and the top edge of which is disposed at an elevation above the bottom edges of the slats in position for limiting the skimmed surface part of the slurry against flow past the trough means in the direction in which said lower flight is moving, said discharge opening communicating with the trap substantially at the level of said abutment.

2. In apparatus for separating a liquid slurry into a plurality of components among which are floating solids, a tank confining said slurry; an endless conveyor chain mounted in the top of said tank and having a lower flight extending horizontally within the tank; slats carried by and projecting outwardly from said chain so as to extend into the slurry and skim floating solids therefrom responsive to operating of the conveyor chain; an inclined apron in the path of the slats, said slats wiping over the face of the apron for shifting the solids out of the slurry and up the inclined surface of the apron; and trough means disposed beyond the apron in the sense of the direction of movement of the slats of the lower flight for receiving the solids, the tank having an outlet communicating with the trough means for flow of said solids out of the trough means, said trough means and apron forming beneath the apron a trap for the slurry, the tank having a discharge opening communicating with the trap for passage of the slurry out of the tank, said tank including opposed side walls, the apron and trough means extending transversely of the tank over the full distance between said side walls, said trough means comprising an abutment the bottom edge of which is spaced downwardly a short distance from the bottom edges of the slats and the top edge of which is disposed at an elevation above the bottom edges of the slats in position for limiting the skimmed surface part of the slurry against flow past the trough means in the direction in which said lower flight is moving, said discharge opening communicating with the trap substantially at the level of said abutment, said apron being inclined slightly from the horizontal, and having lower and upper edges respectively disposed at levels below and above the bottom edges of said slats, the chain being freely flexible at a location above the apron so as to flex upwardly with the slats riding up the incline out of said slurry.

3. In apparatus for separating a liquid slurry into a plurality of components among which are floating solids, a tank confining said slurry; an endless conveyor chain mounted in the top of said tank and having a lower flight extending horizontally within the tank; slats carried by and projecting outwardly from said chain so as to extend into the slurry and skim floating solids therefrom responsive to operating of the conveyor chain; an inclined apron in the path of the slats, said slats wiping over the face of the apron for shifting the solids out of the slurry and up the inclined surface of the apron; and trough means disposed beyond the apron in the sense of the direction of movement of the slats of the lower flight for receiving the solids, the tank having an outlet communicating with the trough means for flow of said solids out of the trough means, said trough means and apron forming beneath the apron a trap for the slurry, the tank having a discharge opening communicating with the trap for passage of the slurry out of the tank, said tank including opposed side walls, the apron and trough means extending transversely of the tank over the full distance between said side walls, said trough means comprising an abutment the bottom edge of which is spaced downwardly a short distance from the bottom edges of the slats and the top edge of which is disposed at an elevation above the bottom edges of the slats, in position for limiting the skimmed surface part of the slurry against flow past the trough means in the direction in which said lower flight is moving, said discharge opening communicating with the trap substantially at the level of said abutment, said tank including upwardly flaring pockets on the outer surfaces thereof into which the discharge openings open from the trap, said pockets rising at their upper ends to an elevation a substantial distance higher than the uppermost portions of the discharge openings.

References Cited in the file of this patent

UNITED STATES PATENTS

| | | |
|---|---|---|
| 1,612,557 | Weisgerber | Dec. 28, 1926 |
| 1,662,720 | Hebden | Mar. 13, 1928 |
| 2,135,442 | Steindorf et al. | Nov. 1, 1938 |
| 2,137,421 | Fark | Nov. 22, 1938 |
| 2,211,565 | Hawley | Aug. 13, 1940 |
| 2,220,574 | Little et al. | Nov. 5, 1940 |
| 2,237,172 | Briggs | Apr. 1, 1941 |
| 2,491,912 | Walker | Dec. 20, 1949 |
| 2,517,117 | Komline | Aug. 1, 1950 |
| 2,635,104 | Chayen | Apr. 14, 1953 |
| 2,759,607 | Boyd et al. | Aug. 21, 1956 |
| 2,813,074 | Banks et al. | Nov. 12, 1957 |

FOREIGN PATENTS

| | | |
|---|---|---|
| 390,989 | Great Britain | Apr. 20, 1933 |